(12) United States Patent
Xie et al.

(10) Patent No.: US 8,363,645 B2
(45) Date of Patent: Jan. 29, 2013

(54) METHOD FOR REALIZING USER DECISION USER BUSY FORWARDING

(75) Inventors: Baoguo Xie, Shenzhen (CN); Shilin You, Shenzhen (CN); Zhenwu Hao, Shenzhen (CN); Jiyan Cai, Shenzhen (CN)

(73) Assignee: ZTE Corporation (CN)

( * ) Notice: Subject to any disclaimer, the term of this patent is extended or adjusted under 35 U.S.C. 154(b) by 513 days.

(21) Appl. No.: 12/668,856

(22) PCT Filed: Dec. 26, 2007

(86) PCT No.: PCT/CN2007/003804
§ 371 (c)(1),
(2), (4) Date: Jan. 12, 2010

(87) PCT Pub. No.: WO2009/015536
PCT Pub. Date: Feb. 5, 2009

(65) Prior Publication Data
US 2010/0189246 A1    Jul. 29, 2010

(30) Foreign Application Priority Data
Jul. 27, 2007    (CN) .......................... 2007 1 0128961

(51) Int. Cl.
*H04L 12/66* (2006.01)
(52) U.S. Cl. ....................................................... 370/352
(58) Field of Classification Search ................... 370/352
See application file for complete search history.

(56) References Cited

U.S. PATENT DOCUMENTS

| | | |
|---|---|---|
| 2005/0096029 A1 | 5/2005 | Pelaez et al. |
| 2009/0073938 A1* | 3/2009 | Zhu et al. ..................... 370/331 |
| 2009/0193131 A1* | 7/2009 | Shi ................................ 709/229 |
| 2010/0054159 A1* | 3/2010 | Zhu et al. ..................... 370/259 |
| 2010/0157985 A1* | 6/2010 | Nakada et al. ............... 370/352 |
| 2011/0268110 A1* | 11/2011 | Watson et al. ............... 370/352 |

FOREIGN PATENT DOCUMENTS

| | | |
|---|---|---|
| CN | 1486066 | 3/2004 |
| CN | 1859426 | 11/2006 |
| CN | 1925525 | 3/2007 |
| WO | 2006/125474 A1 | 11/2006 |

OTHER PUBLICATIONS

World Intellectual Property Organization, State Intellectual Property Office of the PRC as the International Searching Authority (Junru Chen, authorized official); "International Search Report" for PCT/2007/003804; May 15, 2008; four pages. This U.S. application is a national phase of this PCT application.

* cited by examiner

*Primary Examiner* — Albert T Chou
(74) *Attorney, Agent, or Firm* — Kolisch Hartwell, P.C.

(57) ABSTRACT

A method for implementing call forwarding on user-determined user busy, including the following steps of: step 1: after receiving a session request routed by a CSCF from a calling side (401, 402), an IMS Circuit Switched Control Function (ICCF) on a called side establishing a call with a called terminal having IMS Centralized Service (ICS) capability (403), and then the called terminal ringing (410); step 2: sending, by the called terminal, a user-determined user busy message to the ICCF when a called user rejects the call (404); and step 3: notifying, by the ICCF, a Telecom Application Server (TAS) that the called terminal is in a user-determined user busy state (405), and the TAS initiating a procedure of call forwarding on user-determined user busy (406). A method for releasing the established media resources resources and session is also provided.

8 Claims, 6 Drawing Sheets

METHOD FOR REALIZING USER DECISION USER BUSY FORWARDING

TECHNICAL FIELD

The present invention relates to IP Multimedia Core Network Subsystem (IMS) centralized services, and more particularly, to a method for implementing call forwarding on user-determined user busy in IMS centralized services.

BACKGROUND OF THE RELATED ART

An Internet Protocol (IP) Multimedia Core Network Subsystem (IMS), which is an IP-based network architecture presented by the 3rd Generation Partnership Project (3GPP), constructs an open and flexible service environment, supports multimedia applications and provides abundant multimedia services for users.

The IMS, which is an IP-based telecommunication network architecture and is independent of access technologies, may provide services for a mobile cellular network, such as Global System for Mobile communication (GSM), Universal Mobile Telecommunications System (UMTS), etc., in addition to providing services for a packet access network, such as General Packet Radio Service (GPRS), Wireless Local Area Network (WLAN), etc.

The mobile cellular network, such as GSM and UMTS, uses a circuit switching technology, which is called a Circuit Switched (CS) domain and able to provide basic voice services and supplementary services based on voice services for users. When accessing to the IMS, the CS domain evolves into an access mode, where services are provided entirely by the IMS. Such technology is called IMS Centralized Services (ICS for short).

The IMS centralized services have the following advantages:

(1) the IMS provides uniform services for access modes, such as circuit switched domain and packet domain, and supports network convergence;

(2) it supports the evolvement of a CS network into an IMS network; and (3) it supports both a user device with ICS ability and an existing user device without ICS ability.

FIG. 1 is a frame diagram of IMS centralized services comprising the following network elements: a User Equipment (UE) 101, a Visited Mobile Switch Center (VMSC) 102, a Home User Server (HSS) 103, a Media Gateway Control Function (MGCF) 104, a Media Gateway (MGW) 105, an IMS CS Control Function (ICCF) 106, a Call Session Control Function (CSCF) 107 and a Telecom Application Server (TAS) 108.

Three paths from the UE 101 to the ICCF 106 in an IMS domain through the VMSC 102 are established: a session control path, a bearer control path and a bearer path, wherein, The session control path, which passes through the VMSC 102 and the HSS 103, is borne on a CS domain and uses unstructured supplementary service data (USSD). If there is a PS network in a network where the UE 101 is located, then session control signaling may be accessed through the PS network.

The UE 101 in the bearer control path accesses to the VMSC 102 using standard CS control signaling and accesses to the IMS through the MGCF 104 and reaches the ICCF 106 through the CSCF 107.

The UE 101 in the bearer path accesses to the IMS through the VMSC 102 and the MGW 105 and establishes a media connection with a remote user device of the session.

The IMS centralized services utilize the session control path between the UE 101 and the ICCF 106 to interact with session control information and establishes and controls media bearer through the bearer control path, where the ICCF 106 acts as a user agent of the IMS to access to the IMS in place of the user equipment.

The TAS 108 may provide various complementary services, such as call holding, call transfer, number display, call forwarding and thus be called complementary service server.

Call forwarding services are a type of complementary services in communication systems and comprises call forwarding unconditionally, call forwarding on no answer and call forwarding on busy, wherein, mobile user busy includes network-determined user busy and user-determined user busy. The network-determined user busy means that a user state recorded by a network is busy, for example, the user is on the phone; while the user-determined user busy means that a mobile user refuses to answer a call immediately after receiving a call ringing notification and his incoming call is transferred to a preset phone or voice mailbox by a network.

As a telecommunication system, the ICS must support call forwarding services.

FIG. 2 illustrates a prior art scheme where on a session control path in a CS domain, a user A of an IMS calls a user B with ICS capability accessing from the CS domain, and the user B implements a call forwarding procedure through a user-determined user busy cause value contained in a release message. A session between the user B and an ICCF is established using a called process. The procedure shown in FIG. 2 will be described below.

201. The CSCF receives a Session Initiation Protocol (SIP) session request message at a called side initiated from the user A on a calling side to the user B on a called side. The CSCF routes the SIP session request message to a telecom application server (TAS) in charge of call forwarding services based on initial Filter Criteria (iFC) after receiving the SIP session request message.

202. The TAS routes the called SIP session request message to the ICCF through the CSCF.

203. After acquiring a roaming number of the user B, the ICCF routes the SIP session request message of the calling user to a MGCF through the CSCF.

204. The MGCF sends an Initial Address Message (IAM) of an ISDN user part (ISUP) to a VMSC.

205. The VMSC sends a call setup request to the user B, and user B begins to ring.

206. The user B rejects the call because of busyness, sends a hang-up message to the VMSC, and the hang-up message containing the user-determined user busy cause value.

207. The VMSC releases resources of this session and sends a release message to the MGCF, the release message containing the user-determined user busy cause value.

208. The MGCF generates a SIP 486 user busy message based on the user-determined user busy cause value and sends the SIP 486 user busy message to the CSCF, which in turn forwards the SIP 486 user busy message.

209. The ICCF sends back the SIP 486 user busy message to the CSCF, which in turn routes the SIP 486 user busy message to the TAS.

210. The TAS triggers the procedure of call forwarding on user-determined user busy by a call forwarding logic.

FIG. 3 illustrates a prior art scheme where on a session control path in a CS domain, a user A of an IMS calls a user B with ICS capability accessing from the CS domain, and the user B implements a call forwarding procedure by a TAS. A session between the user B and an ICCF is established using a calling process. The procedure shown in FIG. 3 will be described below.

301. The CSCF receives a called SIP session request message initiated from the user A on a calling side to the user B on a called side. The CSCF routes the SIP session request message to a telecom application server (TAS) in charge of call forwarding services based on initial filter criteria (iFC) after receiving the SIP session request message.

302. The TAS routes the called SIP session request message to the ICCF through the CSCF.

303. The ICCF determines, based on the acquired message at the called side, that a called terminal is a UE supporting an ICS, and then assigns an ICCF address (which is a dynamically assigned address) to the user B and sends the SIP session request message containing the ICCF address to the user B using USSD via the session control path in the CS domain.

304. The user B uses the ICCF address as a called number to initiate a call setup request to a VMSC immediately after receiving the SIP session request message.

305. The VMSC analyzes the ICCF address and sends an Initial Address Message (IAM) to a MGCF.

306. The MGCF generates a new SIP session request message and routes it to the CSCF based on the ICCF address, and then the CSCF routes the SIP session request message to the ICCF based on the ICCF address.

307. After receiving the SIP session request message from the user B, the ICCF sends back a SIP 180 ringing message to the CSCF, which in turn sends back the SIP 180 ringing message to the MGCF.

308. The MGCF sends back an Address Complete Message (ACM) to the VMSC after receiving the SIP 180 ringing message.

309. The VMSC sends back the SIP 180 ringing message to the user B.

In the step 307-309, the ICCF sends the ringing message to the terminal UE via the bearer control path in the CS domain to notify the UE of successful setup of the call. The notification of the ICCF is not limited to the SIP ringing message, and other messages may be used.

310. The user B begins to ring and sends the ringing message to the ICCF using USSD via the session control path in the CS domain.

The step 310 is a response to the step 303 and may be omitted without affecting the connection of the ICCF.

311. The ICCF sends the SIP 180 ringing message to the CSCF after receiving the ringing message (or after receiving the SIP session request message from the user B in step 307).

312. The CSCF notifies the user B on calling side to ring.

313. The user B is busy now, and cannot answer the session initiated by the user A on calling side, so the user B rejects the call request and sends a normally disconnecting request to the VMSC, the disconnecting request containing a normally releasing message.

314. The VMSC releases resources for this session and sends the release message to the MGCF.

315: The MGCF converts a resources-releasing request into a SIP cancel request and sends the SIP cancel request to the CSCF, which in turn routes the SIP cancel request to the ICCF and releases the session between the user and the ICCF.

It can be seen from the existing call forwarding procedure that when the call between the user B and the ICCF is established using the called process, the hang-up request sent to the VMSC by the user B may contain a user-determined user busy cause value when the user B refuse to answer the call because of busyness, thereby implementing a call forwarding service user-determined user busy. However, when the call between the user B and the ICCF is established using the calling process, the call forwarding service on user-determined user busy cannot be implemented. This is because, when the user B refuse to answer the call due to busyness, the user B is a calling party, the disconnecting request that he sent to the VMSC is incapable of carry the user-determined user busy cause value but only a normally disconnecting cause value. Thus, when the call between the user B and the ICCF is established using the calling process, the call forwarding service on user-determined user busy cannot be implemented using the existing technology.

SUMMARY OF THE INVENTION

A technical problem to be solved by the present invention is to provide a method for implementing call forwarding on user-determined user busy in IMS centralized services such that a call forwarding service on user-determined user busy can be implemented when a call between an IMS Circuit Switched Control Function (ICCF) and a called user is established, whether using a calling process or a called process.

In order to solve the technical problems described above, the present invention provides a method for implementing calling forwarding on user-determined user busy, the method applies to a call process of an IP Multimedia Core Network Subsystem (IMS) centralized services and comprises the following steps of:

step 1: establishing a call, by an ICCF on a called side, with a called terminal having IMS Centralized Service (ICS) capability after the ICCF receives a session request routed by a Call Session Control Function (CSCF) from a calling side, and then the called terminal ringing;

step 2: sending, by the called terminal, a user-determined user busy message to the IMS CS control function when a user of the called terminal rejects the call; and step 3: notifying, by the ICCF, a Telecom Application Server (TAS) that the called terminal is in a user-determined user busy state through the CSCF, and the TAS initiating a procedure of call forwarding on user-determined user busy.

Further, the method comprises step 4 subsequent to the step 3: releasing media resources and a session established between the called terminal and the ICCF.

Further, in the step 1, the call between the called terminal and the ICCF is established using a calling process or a called process.

Further, in the step 2, the called terminal uses Unstructured Supplementary Service Data (USSD) on a session control path in a circuit switched domain to send the user-determined user busy message to the ICCF.

Further, in the step 2, after receiving the user-determined user busy message from the called terminal, the ICCF converts the user-determined user busy message into a Session Initiation Protocol (SIP) 486 user busy message, and notifies the TAS of the SIP 486 user busy message.

Further, a first way of releasing the media resources is: the called terminal using the Unstructured Supplementary Service Data (USSD) to send the user-determined user busy message to the ICCF and initiating actively a media resource release procedure after the ICCF receives the user-determined user busy message.

Further, after using the USSD to send the user-determined user busy message to the ICCF, the called terminal initiates actively the media resource release procedure after a delay until the ICCF receives the user-determined user busy message.

Further, a second way of releasing the media resources is: after the called terminal uses Unstructured Supplementary Service Data (USSD) to send the user-determined user busy message to the ICCF, the IMS CS control function uses the USSD to return an acknowledgement message to notify the called terminal that the resources can be released, and then the called terminal initiating actively a media resource release procedure.

Further, a third way of releasing the media resources is: after the called terminal uses Unstructured Supplementary Service Data (USSD) to send the user-determined user busy message to the ICCF, the ICCF initiating actively a media resource release procedure.

In the present invention, the ICCF is notified of the user-determined user busy state of the called user using the USSD and then the ICCF notifies the TAS to activate the procedure of call forwarding on user-determined user busy. Thus the procedure of call forwarding on user-determined user busy can be implemented reliably, whether the call between the called user and the ICCF is established using a calling process or a called process. In addition, the present invention also provides a method for releasing the established media resources and session.

PREFERRED EMBODIMENTS OF THE INVENTION

The main innovative points of the present invention are as follows: in IMS centralized services, when a calling user calls a called user, a user-determined user busy cause value contained in USSD may be sent to an ICCF on a session control path in a CS domain such that the ICCF notifies a TAS to initiate a procedure of call forwarding on user-determined user busy, whether a session between the called user and the ICCF is established using a calling process or a called process.

The technical scheme of the present invention will be described in detail below in conjunction with the accompanying drawings and specific embodiments.

In all of the following embodiments, a called user is a user of ICS, i.e., a user with IMS centralized control service capability accessing from a CS domain; application scenario is that access is from a CS network without PS network coverage, and the USSD technology and ICCP protocol are used.

Embodiment 1

Figure 1:
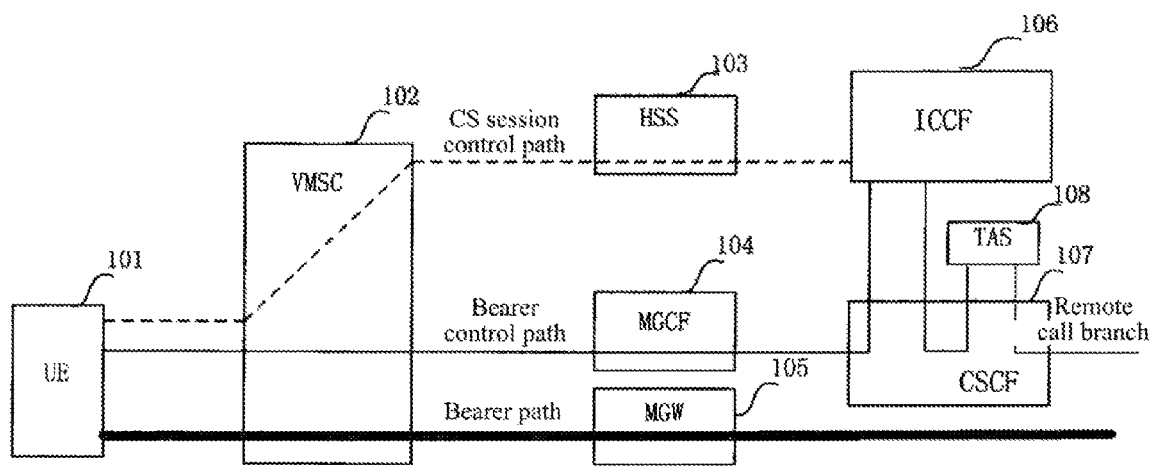
FIG. 1 is a networking frame diagram of IP Multimedia Subsystem (IMS) centralized services.
Figure 2:
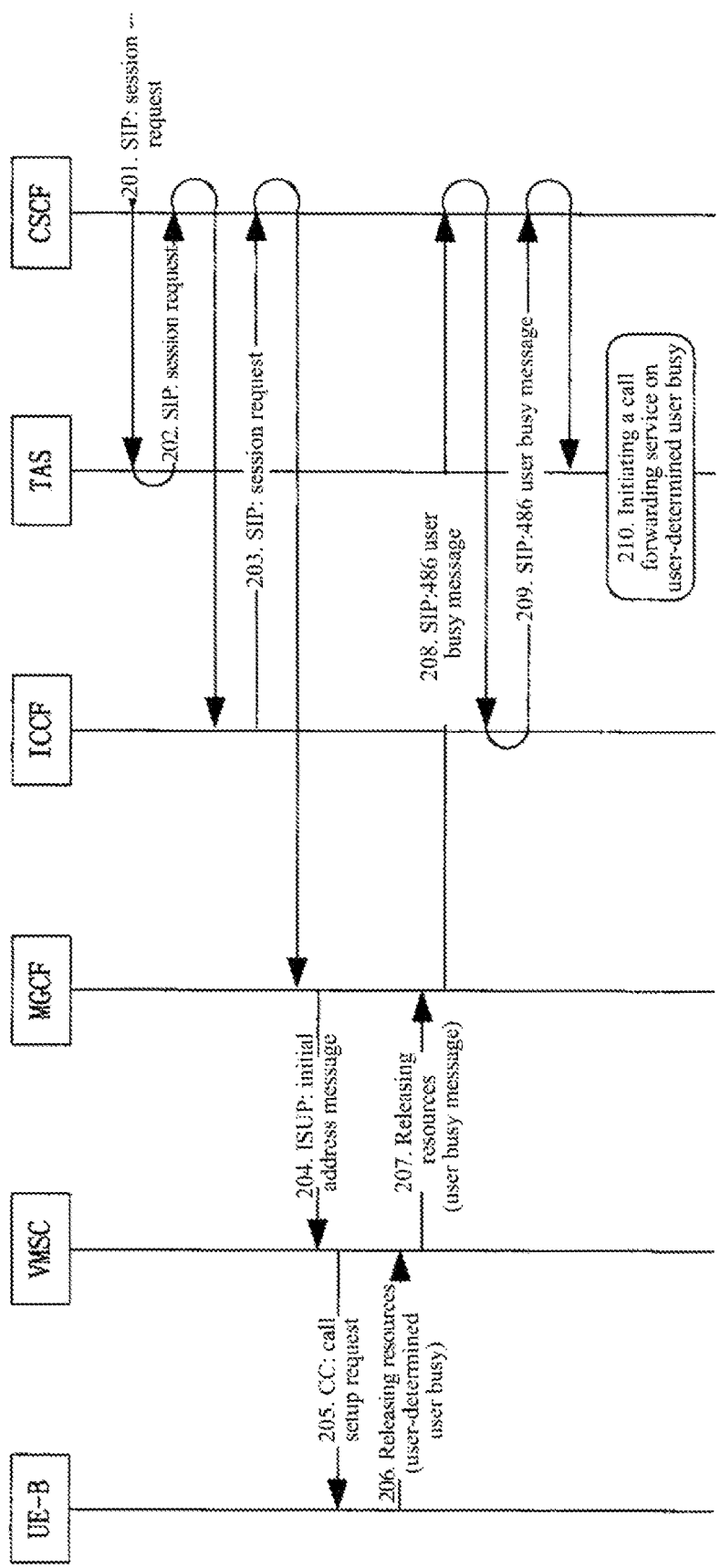
FIG. 2 is a flow chart of a procedure of call forwarding on user-determined user busy in which a session between an ICCF and a called user is established using in a called process in existing IMS centralized services.
Figure 3:
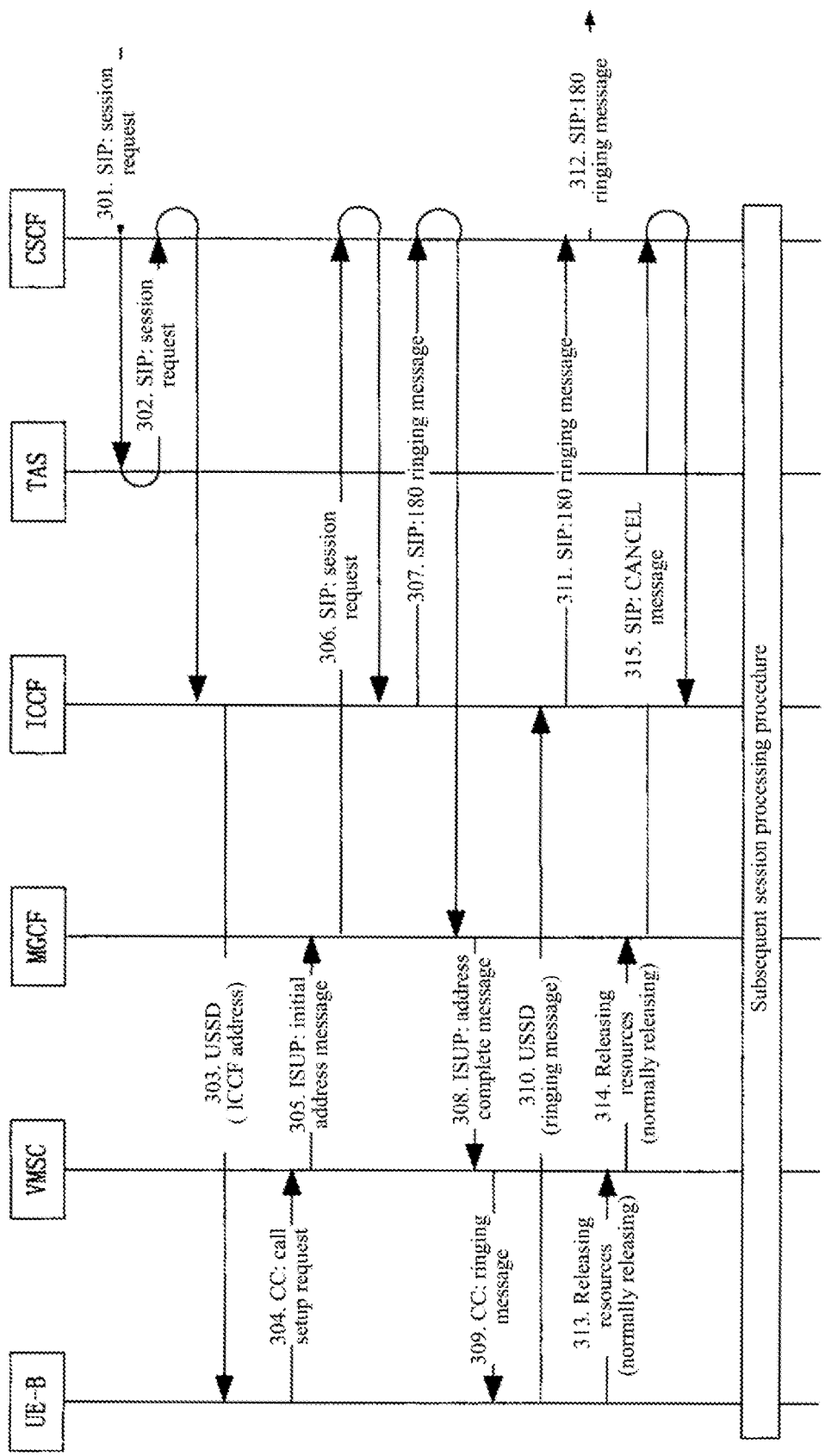
FIG. 3 is a flow chart of a procedure of call forwarding on user-determined user busy in which a session between an ICCF and a called user is established using in a calling process in existing IMS centralized services.
Figure 4:
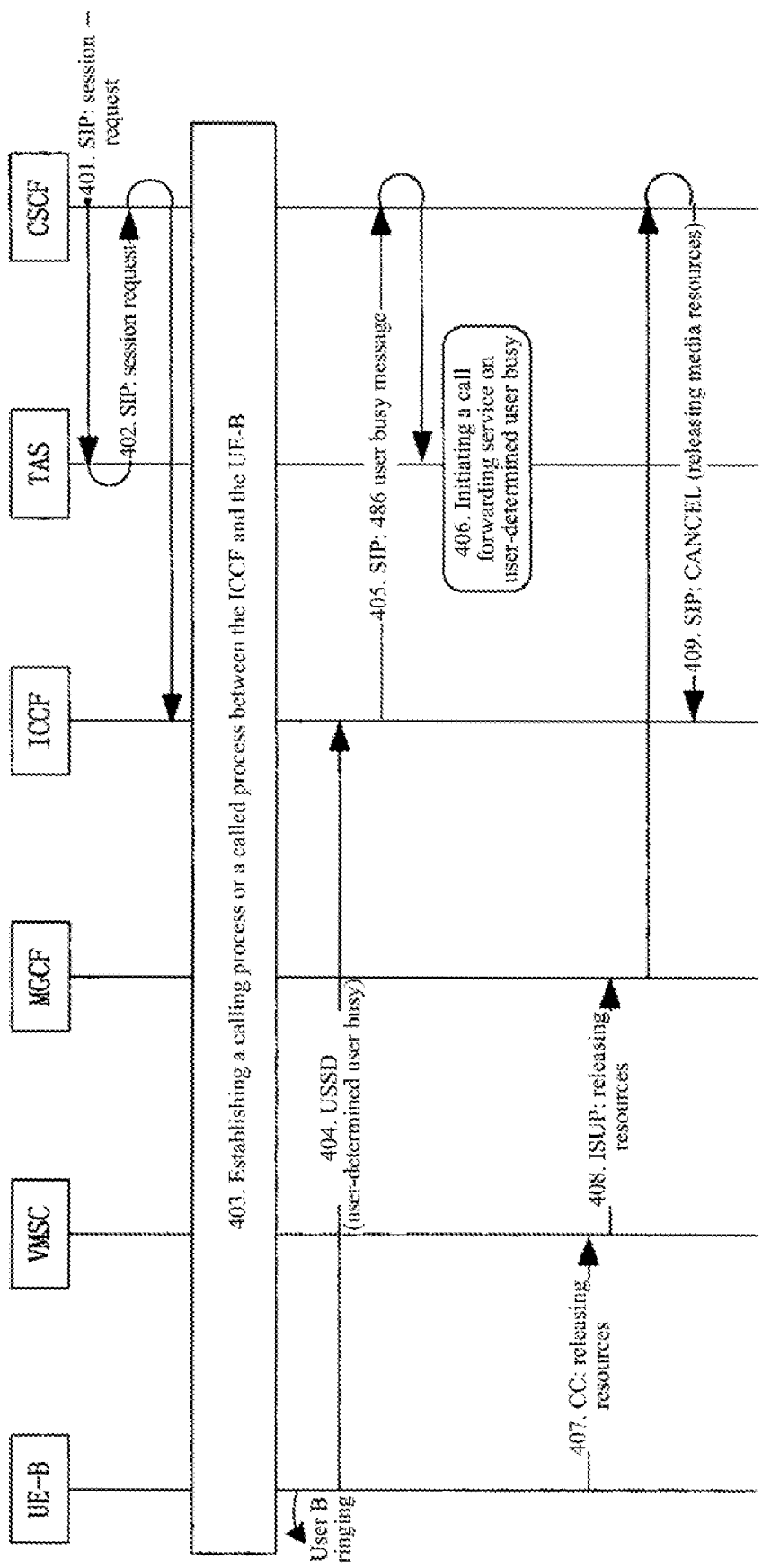
FIG. 4 is a flow chart of the first embodiment of implementing call forwarding on user-determined user busy in IMS centralized services in accordance with the present invention.

FIG. 4 illustrates an implementation flow of embodiment 1 in accordance with the present invention. Its specific steps will be described in detail below.

401. After receiving a called SIP session request message initiated by user A on calling side to user B on called side, a CSCF routes the session request message to a Telecom Application Server (TAS) in charge of call forwarding services according to initial Filter Criteria (iFC).

402. The TAS routes the called session request message to an ICCF through the CSCF.

403. A call setup request is initiated between the ICCF and the User Equipment B (UE-B) through a called process or a calling process and the UE-B rings.

If the called process is used, the ICCF establishes a session with the called UE-B through the CSCF based on a number of the UE-B and the UE-B rings, which is described in detail in the steps 203-206.

If the calling process is used, the ICCF assigns an ICCF address to the UE-B and sends the session request message containing the ICCF address to the UE-B via a session control path on a CS domain, the UE-B uses the ICCF address as a called number to send the call setup request and establishes a session with the ICCF via a bearer control path, and the ICCF responds to the UE-B with a ringing message such that the UE-B rings, which is described in detail in the steps 303-312.

404. The user B is unable to answer the session initiated from the user A on calling side because of busyness and then rejects the call request, and the UE-B sends a user-determined user busy message contained in USSD to the ICCF on the session control path in the CS domain.

405. The ICCF generates a SIP 486 user busy message (SIP 486 means that the terminal user is busy) and sends it to the CSCF, and then CSCF routes the SIP 486 user busy message to the TAS after receiving it.

406. The TAS triggers a procedure of call forwarding on user-determined user busy according to a call forwarding logic after receiving the SIP 486 user busy message.

407. After sending the user-determined user busy message to the ICCF using the USSD in the step 404, the user B sends a release message to a VMSC to release media resources from the user B to the VMSC after delayed until the ICCF receives the user-determined user busy message in the USSD.

That the user B takes the delay mainly intends to allow the ICCF receive the user-determined user busy message in the USSD first and be notified to start the procedure of call forwarding on user-determined user busy procedure. If the user B does not take the delay, it is possible that a resource release message of the user B arrives at the ICCF first, thus resulting in the releasing of the session between the calling user and the called user.

If that the user B sends the release message to the VMSC while sending the user-determined user busy message using the USSD to the ICCF does not cause the resource release message of the user B to arrive at the ICCF first but cause the session between the called user and the calling user to be released, then the user B may send the release message to the VMSC while sending the user-determined user busy message using the USSD to the ICCF.

408. The VMSC sends the release message of ISUP to a MGCF to release media resources from the VMSC to the MGCF.

409. The MGCF generates a SIP cancel message and sends it to the ICCF through the CSCF to release the session between the user B and the ICCF.

Embodiment 2

Figure 5:
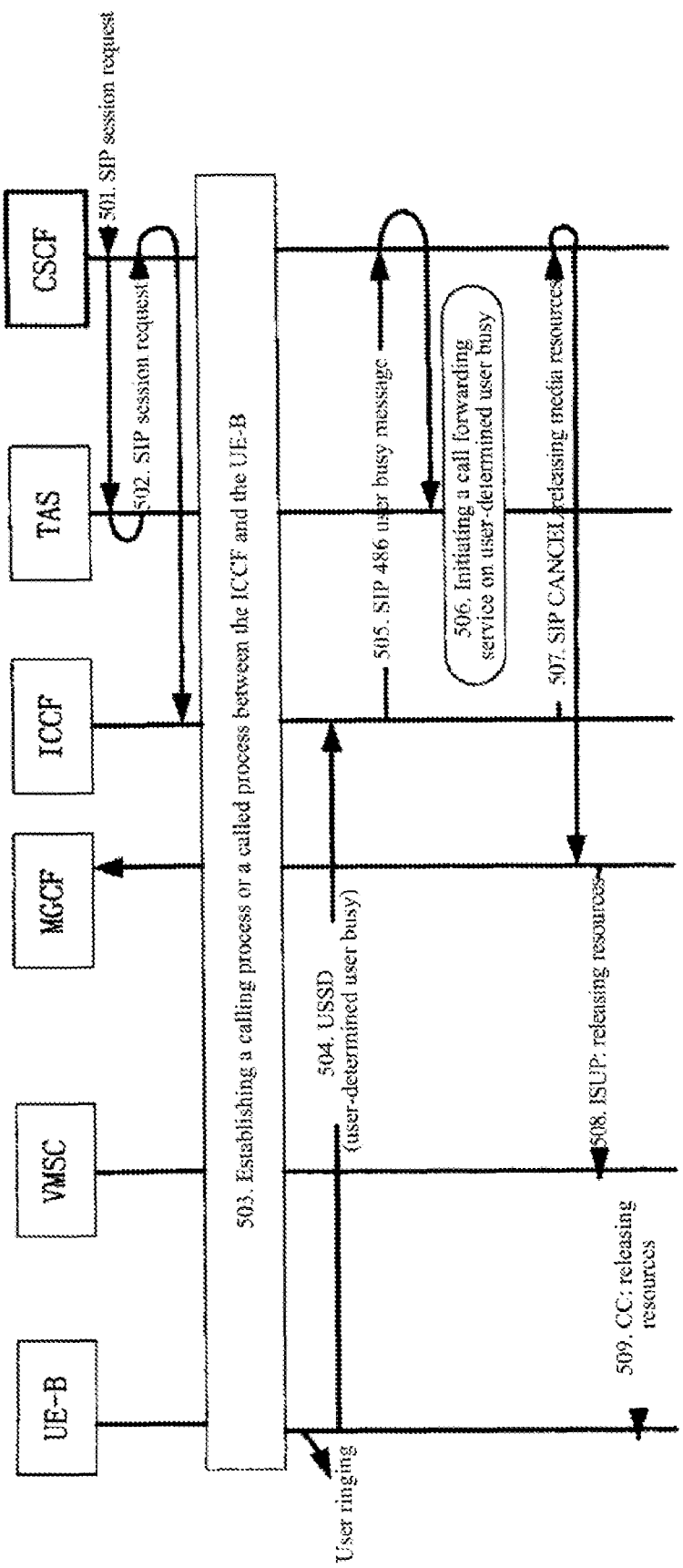
FIG. 5 is a flow chart of the second embodiment of implementing call forwarding on user-determined user busy in IMS centralized services in accordance with the present invention.

FIG. 5 illustrates a flow of implementing embodiment 2 in accordance with the present invention. The difference between embodiment 1 shown in FIG. 4 and embodiment 2 consists in an implementation method of a media resource release procedure. FIG. 4 illustrates a media resource releasing procedure initiated actively by the user B, while FIG. 5 illustrates a media resource releasing procedure initiated by the ICCF. Steps 501-506 correspond to steps 401-406 respectively and will not be repeated herein. The different steps will be described in detail below.

507. In addition to sending the SIP 486 user busy message to the TAS in step 505, the ICCF sends a SIP cancel message to a MGCF and release the session between the ICCF and the user B.

508. The MGCF converts the SIP cancel message into a release message of ISUP to send it to the VMSC to release media resources from the MGCF to the VMSC.

509. The VMSC sends the release message to the UE-B to release media resources from the VMSC to the user B.

In this case the UE-B no longer sends the release message to the VMSC.

Embodiment 3

Figure 6:
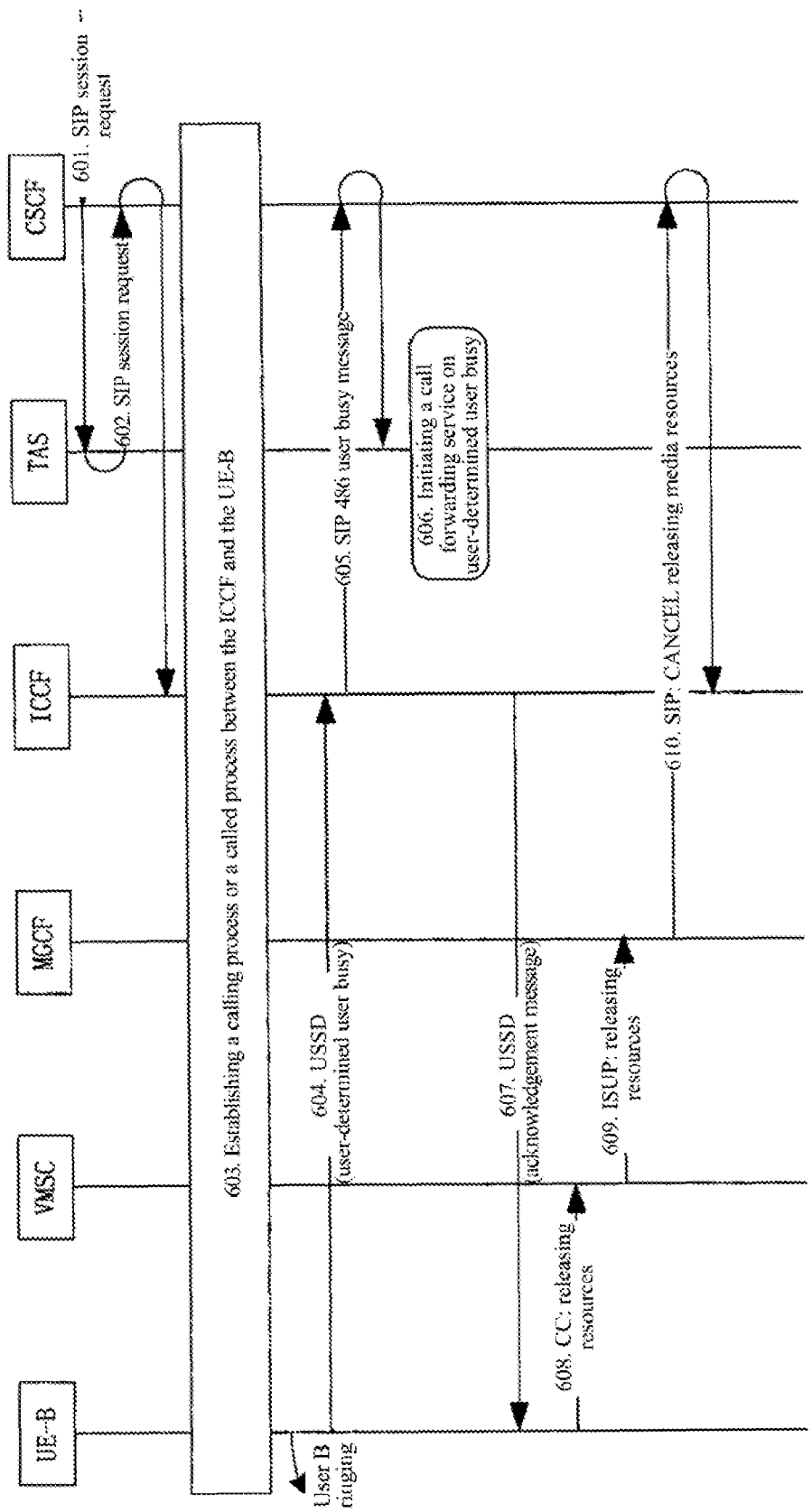
FIG. 6 is a flow chart of the third embodiment of implementing call forwarding on user-determined user busy in IMS centralized services in accordance with the present invention.

FIG. 6 illustrates a flow of implementing embodiment 3 in accordance with the present invention. The difference between embodiment 1 shown in FIG. 4 and embodiment 3 also consists in an implementation means of a media resource releasing procedure. In FIG. 4, after sending a user-determined user busy message to the ICCF using the USSD, the user B initiates actively the media resource release procedure after delayed for a period of time, while in FIG. 6, after the user B sends a user-determined user busy message to the ICCF using the USSD, the ICCF in turn sends a confirmation message to the user B using the USSD, and then the user B initiates the media resource release procedure immediately after receiving the confirmation message. So, steps 601-606 correspond to step 401-406 respectively. The steps subsequent to step 606 will be described in detail below.

607. After receiving the SIP 486 user busy message sent by the UE-B in step 605, the ICCF sends a confirmation message to the UE-B using the USSD via the session control path in the CS domain to notify the UE-B that media resources from the ICCF to the UE-B may be released.

608. The user B sends a release message to the VMSC to release media resources from the user B to the VMSC.

The subsequent steps 609-610 correspond to steps 408-409 respectively and will not be repeated herein.

Of course, there may be a variety of other embodiments in accordance with the invention. Various corresponding modifications and variations, which are within the protection scope of the invention as defined by the appended claims, may be made by those skilled in the art in light of the invention without departing from the spirit and scope the invention.

Industrial Applicability

In the present invention, an ICCF is notified of a user-determined user busy state of a called user using USSD and then the ICCF notifies a TAS to activate a procedure of call forwarding on user-determined user busy. Thus the procedure of call forwarding on user-determined user busy procedure can be implemented reliably, whether the call between the called user and the ICCF is established using a calling process or a called process.

What is claimed is:

1. A method for implementing call forwarding on user-determined user busy, applied in a call process of an Internet Protocol Multimedia Core Network Subsystem (IMS) centralized service, the method comprising the following steps of:

step 1: establishing a call, by an IMS Circuit Switched Control Function (ICCF) on a called side, with a called terminal having IMS Centralized Service (ICS) capability after the ICCF receives a session request routed by a Call Session Control Function (CSCF) from a calling side, and then the called terminal ringing;

step 2: sending, by the called terminal, a user-determined user busy message to the ICCF when a user of the called terminal rejects the call, wherein the called terminal uses Unstructured Supplementary Service Data (USSD) on a session control path in a circuit switched domain to send the user-determined user busy message to the ICCF; and step 3: notifying, by the ICCF, a Telecom Application Server (TAS) that the called terminal is in a user-determined user busy state through the CSCF, and the TAS initiating a procedure of call forwarding on user-determined user busy.

2. The method according to claim 1, further comprising step 4 subsequent to the step 3: releasing media resources and a session established between the called terminal and the ICCF.

3. The method according to claim 2, wherein releasing the media resources includes: the called terminal using Unstructured Supplementary Service Data (USSD) to send the user-determined user busy message to the ICCF and initiating actively a media resource release procedure after the ICCF receives the user-determined user busy message.

4. The method according to claim 3, wherein after using the USSD to send the user-determined user busy message to the ICCF, the called terminal initiates actively the media resource release procedure after a delay until the ICCF receives the user-determined user busy message.

5. The method according to claim 2, wherein releasing the media resources includes: after the called terminal uses Unstructured Supplementary Service Data (USSD) to send the user-determined user busy message to the ICCF, the ICCF using the USSD to return an acknowledgement message to notify the called terminal that the resources can be released, and then the called terminal initiating actively a media resources release procedure.

6. The method according to claim 2, wherein releasing the media resources includes: after the called terminal uses Unstructured Supplementary Service Data (USSD) to send the user-determined user busy message to the ICCF, the ICCF initiating actively a media resources release procedure.

7. The method according to claim 1, wherein in the step 1, the call between the called terminal and the ICCF is established using a calling process or a called process.

8. The method according to claim 1, wherein in the step 2, after receiving the user-determined user busy message from the called terminal, the ICCF converts the user-determined user busy message into a Session Initiation Protocol (SIP) 486 user busy message, and notifies the TAS of the SIP 486 user busy message.

* * * * *